United States Patent
Sung et al.

(10) Patent No.: US 10,026,376 B2
(45) Date of Patent: Jul. 17, 2018

(54) POWER MANAGEMENT INTEGRATED CIRCUIT AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Chiachia Sung, Beijing (CN); Lei Liu, Beijing (CN); Dianzheng Dong, Beijing (CN); Chengte Lai, Beijing (CN); Guangxing Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 177 days.

(21) Appl. No.: 15/134,780

(22) Filed: Apr. 21, 2016

(65) Prior Publication Data

US 2016/0314757 A1 Oct. 27, 2016

(30) Foreign Application Priority Data

Apr. 24, 2015 (CN) .......................... 2015 1 0203039

(51) Int. Cl.
*G09G 3/36* (2006.01)
*G06F 1/32* (2006.01)
(Continued)

(52) U.S. Cl.
CPC ............. *G09G 3/3696* (2013.01); *G05F 3/08* (2013.01); *G06F 1/3234* (2013.01); *G05F 1/10* (2013.01);
(Continued)

(58) Field of Classification Search
CPC ........... G09G 5/003; G09G 2310/0289; G09G 2310/0291; G09G 2310/08; G09G 3/3696; G05F 3/08; G05F 1/10; G05F 1/66; G05F 1/465; G05F 1/565; G05F 1/567; G05F 1/571; G05F 1/573; G05F 1/575;
(Continued)

(56) References Cited

U.S. PATENT DOCUMENTS 5,754,155 A 5/1998 Kubota et al.
9,613,572 B2 * 4/2017 Lee ....................... G09G 3/3406
(Continued)

FOREIGN PATENT DOCUMENTS

CN 1282131 A 1/2001
CN 1846354 A 10/2006
(Continued)

OTHER PUBLICATIONS

Second Office Action regarding CN Application No. 2015102030398 dated Jul. 18, 2016. Translation provided by Dragon Intellectual Property Law Firm.
(Continued)

*Primary Examiner* — Darlene M Ritchie
(74) *Attorney, Agent, or Firm* — Harness, Dickey & Pierce, P.L.C.

(57) ABSTRACT

The present disclosure provides a power management integrated circuit (PMIC) and a display device. The PMIC includes an FBN and a DC voltage output unit configured to output different DC voltages to the FBN in a time-division manner.

9 Claims, 2 Drawing Sheets

(51) Int. Cl.
*G05F 3/08* (2006.01)
*G05F 1/10* (2006.01)
*G05F 1/66* (2006.01)
*G06F 1/26* (2006.01)
*G09G 5/00* (2006.01)

(52) U.S. Cl.
CPC ............... *G05F 1/66* (2013.01); *G06F 1/26* (2013.01); *G09G 5/003* (2013.01); *G09G 2310/0289* (2013.01); *G09G 2310/0291* (2013.01); *G09G 2310/08* (2013.01); *G09G 2330/021* (2013.01); *G09G 2330/025* (2013.01)

(58) Field of Classification Search
CPC . G06F 1/26; G06F 1/263; G06F 1/266; G06F 1/3234; G06F 1/3296; G06F 1/3265; Y02D 10/172
See application file for complete search history.

(56) References Cited

U.S. PATENT DOCUMENTS

| | | | | |
|---|---|---|---|---|
| 2007/0115271 A1* | 5/2007 | Seo | ............... | G09G 3/3688 345/204 |
| 2008/0122812 A1* | 5/2008 | Park | ............... | G09G 3/3648 345/204 |
| 2008/0238208 A1* | 10/2008 | Potter | ............... | G06F 1/26 307/75 |
| 2010/0156872 A1* | 6/2010 | Pankaj | ............... | G09G 3/3696 345/211 |
| 2011/0050670 A1* | 3/2011 | Kim | ............... | G05F 1/46 345/211 |
| 2011/0141098 A1* | 6/2011 | Yaguma | ............... | G09G 3/3688 345/212 |
| 2011/0234000 A1* | 9/2011 | Yan | ............... | H02M 3/157 307/31 |
| 2011/0285685 A1* | 11/2011 | Naito | ............... | H05B 33/0818 345/211 |
| 2012/0146520 A1* | 6/2012 | Liu | ............... | G09G 3/3406 315/192 |
| 2013/0003230 A1* | 1/2013 | Kojima | ............... | H05B 33/089 361/18 |
| 2015/0089261 A1* | 3/2015 | Segawa | ............... | G06F 1/3296 713/322 |
| 2015/0188431 A1* | 7/2015 | Cho | ............... | G09G 3/2003 345/212 |
| 2015/0280703 A1* | 10/2015 | Jeon | ............... | H03K 17/165 327/382 |
| 2015/0359057 A1* | 12/2015 | Lee | ............... | G09G 3/3406 345/691 |
| 2016/0070294 A1* | 3/2016 | Chung | ............... | H03K 5/24 345/213 |
| 2016/0148570 A1* | 5/2016 | Lee | ............... | G09G 3/3225 345/211 |
| 2016/0172978 A1* | 6/2016 | Fukumoto | ............... | H02M 3/156 713/300 |

FOREIGN PATENT DOCUMENTS

| | | |
|---|---|---|
| CN | 101303888 A | 11/2008 |
| CN | 201365305 Y | 12/2009 |
| JP | 2006136110 A | 5/2006 |

OTHER PUBLICATIONS

First Office Action regarding Chinese application No. 201510203039.8, dated Dec. 4, 2015. Translation provided by Dragon Intellectual Property Law Firm.

* cited by examiner

POWER MANAGEMENT INTEGRATED CIRCUIT AND DISPLAY DEVICE

CROSS-REFERENCE TO RELATED APPLICATION

The present application claims a priority of the Chinese Patent Application No. 201510203039.8 filed on Apr. 24, 2015, which is incorporated herein by reference in its entirety.

TECHNICAL FIELD

The present disclosure relates to the field of power management technology, in particular to a power management integrated circuit (PMIC) and a display device.

BACKGROUND

An output node (FBN) of a conventional PMIC can merely output an identical direct current (DC) level. When it is desired to control a low level VGL (e.g., different voltage levels are required at the start-up moment and during the operation, or the low level VGL is required when detecting different images or different temperatures), a printed circuit board assembly (PCBA) needs to be provided with an additional control circuit. At this time, the circuits on the PCBA and the layout thereof need to be changed, and more space needs to be provided for elements on the PCBA.

SUMMARY

A main object of the present disclosure is to provide a PMIC and a display device, so as to prevent the occurrence of local oscillator leakage at the start-up moment and improve the image quality, without any change in the circuits of the PCBA and the layout thereof, or any increase in the space for the elements on the PCBA.

In one aspect, the present disclosure provides in some embodiments a PMIC, including a FBN, and a DC voltage output unit configured to output different DC voltages to the FBN in a time-division manner.

Alternatively, the DC voltage output unit includes a DC voltage generation module configured to generate a first DC voltage and a second DC voltage, and an output module configured to output the first DC voltage and the second DC voltage to the FBN in a time-division manner.

Alternatively, the output module includes a delay circuit configured to delay a first clock signal for a predetermined time period to acquire a second clock signal, and a multiplexer configured to output the first DC voltage and the second DC voltage to the FBN in a time-division manner in accordance with the first clock signal and the second clock signal.

Alternatively, the output module further includes an operation amplifier, a non-inverting input end of which is connected to an output end of the multiplexer, an inverting input end of which is connected to an output end of the operation amplifier, and the output end of which is connected to the FBN.

Alternatively, the DC voltage generation module is a bandgap reference voltage source.

Alternatively, when one or both of the first clock signal and the second clock signal is of a low level, the multiplexer outputs the first DC voltage, and when both the first clock signal and the second clock signal are of high levels, the multiplexer outputs the second DC voltage.

In another aspect, the present disclosure provides in some embodiments a display device including the above-mentioned PMIC.

Alternatively, the display device further includes a gate driver circuit, and the PMIC is configured to apply different DC voltages to the gate driver circuit through the FBN in a time-division manner.

Alternatively, the DC voltage output unit includes a DC voltage generation module configured to generate a first DC voltage and a second DC voltage, and an output module configured to output the first DC voltage and the second DC voltage to the FBN in a time-division manner.

Alternatively, the output module includes a delay circuit configured to delay a first clock signal for a predetermined time period to acquire a second clock signal, and a multiplexer configured to output the first DC voltage and the second DC voltage to the FBN in a time-division manner in accordance with the first clock signal and the second clock signal.

Alternatively, the output module further includes an operation amplifier, a non-inverting input end of which is connected to an output end of the multiplexer, an inverting input end of which is connected to an output end of the operation amplifier, and the output end of which is connected to the FBN.

Alternatively, when one or both of the first clock signal and the second clock signal is of a low level, the multiplexer outputs the first DC voltage, and when both the first clock signal and the second clock signal are of high levels, the multiplexer outputs the second DC voltage.

Alternatively, the DC voltage generation module is a bandgap reference voltage source.

According to the embodiments of the present disclosure, the PMIC may directly output the different DC voltages in a time-division manner without any external circuit, so as to control the low level VGL conveniently. As a result, it is able to prevent the occurrence of local oscillator leakage at the start-up moment and improve the image quality, without any change in the circuits of the PCBA and the layout thereof, or any increase in the space for the elements on the PCBA.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1A:
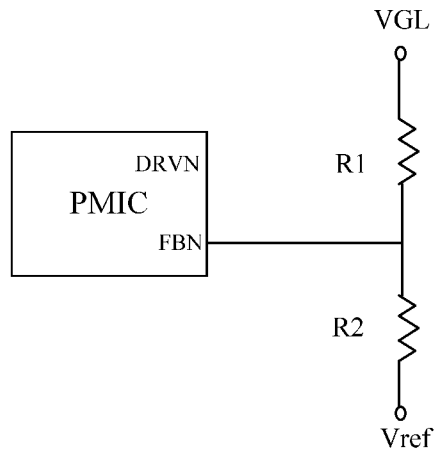
FIG. 1A is a schematic view showing a PMIC for controlling a low level VGL through an external circuit.
Figure 1B:
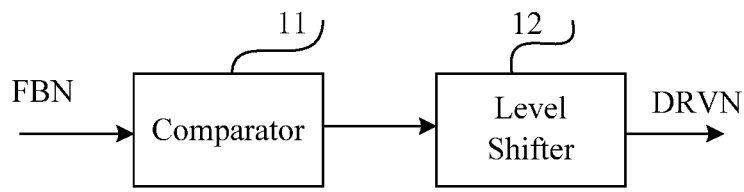
FIG. 1B is a schematic view showing an internal circuit of the PMIC arranged between an FBN and a driving node (DRVN)

As shown in FIG. 1A, which is a schematic view showing a PMIC for controlling a low level VGL through an external circuit, the PMIC needs to be provided with a first resistor R1 and a second resistor R2 when a DC voltage Vfbn is outputted via an FBN, and the low level VGL may be adjusted by setting a proportion of a voltage difference between a reference voltage Vref and the DC voltage Vfbn to a voltage difference between the DC voltage Vfbn and the low level VGL, where DRVN represents a driving node. As shown in FIG. 1B, a signal is transmitted from the FBN to a comparator 11, a level shifter 12 and the DRVN sequentially, so as to obtain an output signal. For this PMIC, when it is required to adjust the VGL, circuits on a PCBA and the layout thereof need to be changed, and more space needs to be provided for elements on the PCBA.

Figure 2:
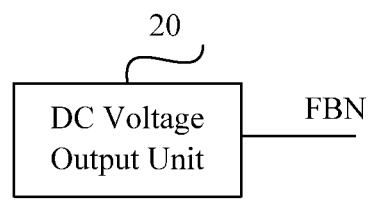
FIG. 2 is a schematic view showing the connection relationship between a DC voltage output unit 20 and an FBN of a PMIC according to one embodiment of the present disclosure.

The present disclosure provides in some embodiments a PMIC which, as shown in FIG. 2, includes a FBN, and a DC voltage output unit 20 configured to output different DC voltages to the FBN in a time-division manner.

According to the PMIC in the embodiments of the present disclosure, the PMIC may directly output the different DC voltages in a time-division manner without any external circuit, so as to control the low level VGL conveniently. As a result, it is able to prevent the occurrence of local oscillator leakage at the start-up moment and improve the image quality, without any change in the circuits of the PCBA and the layout thereof, or any increase in the space for the elements on the PCBA.

Figure 3:
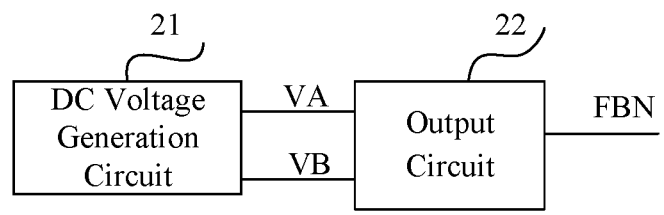
FIG. 3 is a schematic view showing the DC voltage output unit 20 of the PMIC according to one embodiment of the present disclosure.

To be specific, as shown in FIG. 3, the DC voltage output unit 20 includes a DC voltage generation module 21 configured to generate a first DC voltage VA and a second DC voltage VB, and an output module 22 configured to output the first DC voltage VA and the second DC voltage VB to the FBN in a time-division manner.

Figure 4:
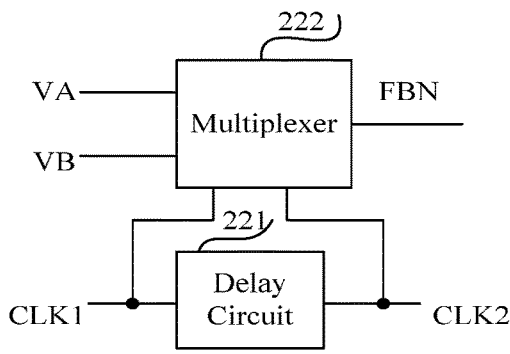
FIG. 4 is a schematic view showing an output module 22 of the DC voltage output unit 20 of the PMIC according to one embodiment of the present disclosure.

To be specific, as shown in FIG. 4, the output module 22 includes a delay circuit 221 configured to delay a first clock signal CLK1 for a predetermined time period T to acquire a second clock signal CLK2, and a multiplexer 222 configured to output the first DC voltage VA and the second DC voltage VB to the FBN in a time-division manner in accordance with the first clock signal CLK1 and the second clock signal CLK2.

Figure 5:
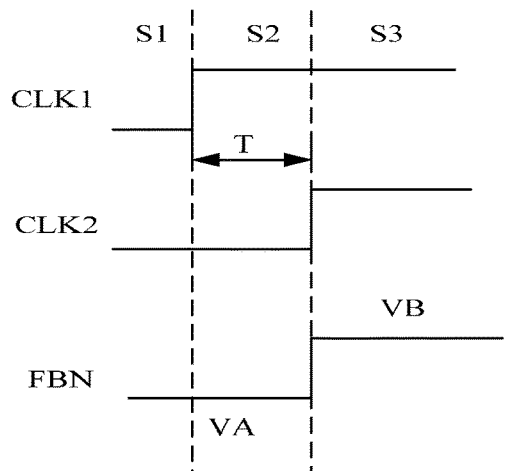
FIG. 5 is a signal sequence diagram of the output module 22 in FIG. 4.

FIG. 5 is a sequence diagram of CLK1 and CLK2. At a first stage S1, both CLK1 and CLK2 are of low levels. At a second stage S2, CLK1 is of a high level and CLK2 is of a low level. At a third stage S3, both CLK1 and CLK2 are of high levels. An output signal from the multiplexer 222 is controlled by the CLK1 and the CLK2. When one or both of the CLK1 and the CLK2 is of a low level, the multiplexer 222 may output the first DC voltage VA, and when both the CLK1 and the CLK2 are of high levels, the multiplexer 222 may output the second DC voltage VB.

Figure 6:
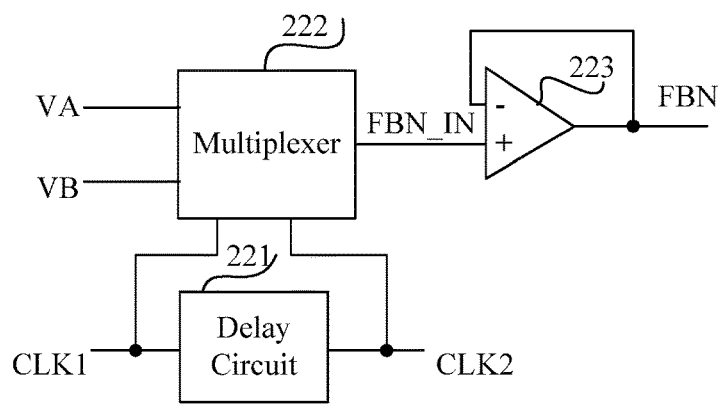
FIG. 6 is another schematic view showing the output module 22 of the DC voltage output unit 20 of the PMIC according to one embodiment of the present disclosure.

Alternatively, as shown in FIG. 6, the output module 22 further includes an operation amplifier 223, a non-inverting input end of which is connected to an output end FBN_IN of the multiplexer 222, an inverting input end of which is connected to an output end of the operation amplifier 223, and the output end of which is connected to the FBN.

Usually, the PMIC includes an Inter-Integrated Circuit (I2C) bus, which includes two bi-directional serial lines, i.e., a data line and a clock line. Through the I2C bus, it is able to achieve the DC level adjustment and the time delay. The functions of the I2C bus included in the PMIC are known in the art, and thus will not be particularly defined herein.

Figure 7:
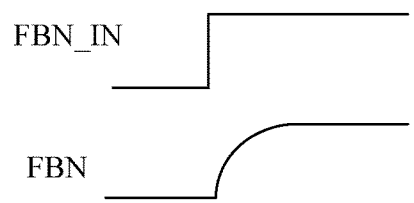
FIG. 7 is a signal sequence diagram of the output module 22 in FIG. 6.

As shown in FIG. 7, the operation amplifier 223 is used as a buffer circuit, so as to enable the FBN to output a slowly-varying waveform, thereby to prevent the occurrence of a sudden current due to rapid voltage changeover.

To be specific, the DC voltage generation module is a bandgap reference voltage source.

The present disclosure further provides in some embodiments a display device which includes the above-mentioned PMIC.

Alternatively, the display device further includes a gate driver circuit, and the PMIC is configured to apply different DC voltages to the gate driver circuit through the FBN in a time-division manner.

The display device may be a liquid crystal display device, e.g., a liquid crystal panel, a liquid crystal television, a mobile phone or a liquid crystal display. Apart from the liquid crystal display device, the display device may be an organic light-emitting diode (OLED) display device or any other display devices, e.g., an electronic reader.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A power management integrated circuit (PMIC), comprising:
   an output node (FBN); and
   a direct current (DC) voltage output unit configured to output different DC voltages to the FBN in a time-division manner,
   wherein the DC voltage output unit comprises:
      a DC voltage generation circuit configured to generate a first DC voltage and a second DC voltage; and
      an output circuit configured to output the first DC voltage and the second DC voltage to the FBN in a time-division manner, and
   wherein the output circuit comprises:

a delay circuit configured to delay a first clock signal for a predetermined time period to acquire a second clock signal; and a multiplexer configured to output the first DC voltage and the second DC voltage to the FBN in a time-division manner in accordance with the first clock signal and the second clock signal, wherein when one or both of the first clock signal and the second clock signal is of a low level, the multiplexer outputs the first DC voltage, and when both the first clock signal and the second clock signal are of high levels, the multiplexer outputs the second DC voltage.

2. The PMIC according to claim 1, wherein the output circuit further comprises:

an operation amplifier, a non-inverting input end of which is connected to an output end of the multiplexer, an inverting input end of which is connected to an output end of the operation amplifier, and the output end of which is connected to the FBN.

3. The PMIC according to claim 1, wherein the DC voltage generation circuit is a bandgap reference voltage source.

4. The PMIC according to claim 2, wherein the DC voltage generation circuit is a bandgap reference voltage source.

5. A display device, comprising: a power management integrated circuit (PMIC), the PMIC comprising:

an output node (FBN); and a direct current (DC) voltage output unit configured to output different DC voltages to the FBN in a time-division manner, wherein the DC voltage output unit comprises:

a DC voltage generation circuit configured to generate a first DC voltage and a second DC voltage; and an output circuit configured to output the first DC voltage and the second DC voltage to the FBN in a time-division manner, wherein the output circuit comprises:

a delay circuit configured to delay a first clock signal for a predetermined time period to acquire a second clock signal; and a multiplexer configured to output the first DC voltage and the second DC voltage to the FBN in a time-division manner in accordance with the first clock signal and the second clock signal, wherein when one or both of the first clock signal and the second clock signal is of a low level, the multiplexer outputs the first DC voltage, and when both the first clock signal and the second clock signal are of high levels, the multiplexer outputs the second DC voltage.

6. The display device according to claim 5, further comprising a gate driver circuit, wherein the PMIC is configured to apply different DC voltages to the gate driver circuit through the FBN in a time-division manner.

7. The display device according to claim 5, wherein the output circuit further comprises:

an operation amplifier, a non-inverting input end of which is connected to an output end of the multiplexer, an inverting input end of which is connected to an output end of the operation amplifier, and the output end of which is connected to the FBN.

8. The display device according to claim 5, wherein the DC voltage generation circuit is a bandgap reference voltage source.

9. The display device according to claim 7, wherein the DC voltage generation circuit is a bandgap reference voltage source.

* * * * *